(12) United States Patent
Hermey et al.

(10) Patent No.: US 12,085,203 B2
(45) Date of Patent: Sep. 10, 2024

(54) OPERATIONALLY STABLE SIDE PLATE FOR AN ENERGY CHAIN

(71) Applicant: IGUS GMBH, Cologne (DE)

(72) Inventors: Andreas Hermey, Hennef (DE); Thilo-Alexander Jaeker, Sankt Augustin (DE); Georg Theiss, Cologne (DE); Stefan Strack, Koenigswinter (DE)

(73) Assignee: IGUS GMBH, Cologne (DE)

( * ) Notice: Subject to any disclaimer, the term of this patent is extended or adjusted under 35 U.S.C. 154(b) by 424 days.

(21) Appl. No.: 17/310,178

(22) PCT Filed: Jan. 22, 2020

(86) PCT No.: PCT/EP2020/051520
§ 371 (c)(1),
(2) Date: Jul. 23, 2021

(87) PCT Pub. No.: WO2020/152221
PCT Pub. Date: Jul. 30, 2020

(65) Prior Publication Data
US 2022/0082184 A1    Mar. 17, 2022

(30) Foreign Application Priority Data

Jan. 25, 2019    (DE) .................... 20 2019 100 465.7

(51) Int. Cl.
*F16L 3/015*    (2006.01)
*F16G 13/16*    (2006.01)
*H02G 11/00*    (2006.01)

(52) U.S. Cl.
CPC .............. *F16L 3/015* (2013.01); *F16G 13/16* (2013.01)

(58) Field of Classification Search
CPC ......... F16G 13/16; F16L 3/015; H02G 11/006
See application file for complete search history.

(56) References Cited

U.S. PATENT DOCUMENTS

| | | |
|---|---|---|
| 4,813,224 A | 3/1989 | Blase |
| 5,020,313 A | 6/1991 | Moritz et al. |
| (Continued) | | |

FOREIGN PATENT DOCUMENTS

| | | |
|---|---|---|
| DE | 3139735 | 7/1983 |
| DE | 3531066 | 3/1987 |
| (Continued) | | |

OTHER PUBLICATIONS

International Preliminary Report on Patentability from corresponding PCT Appln. No. PCT/EP2020/051520, dated Jul. 27, 2021.
(Continued)

*Primary Examiner* — Mohammed S. Alawadi
(74) *Attorney, Agent, or Firm* — Grossman, Tucker, Perreault & Pfleger, PLLC

(57) ABSTRACT

The invention relates to a side plate (10; 30A, 30B) for an energy chain, comprising a single-piece plate body that is made of plastic and has two overlapping regions (11A, 11B; 31A . . . 31D), each for pivotable connection to a corresponding overlapping region of an adjoining plate, the plate body also having a center region (12; 32A, 32B) between the overlapping regions. The overlapping regions and the center region have a number of cross-section transitions, each of which is located between two outer partial surfaces and at least one of which is rounded or broken (Q1 . . . Q5) between a first partial surface (F11, F21, F31) of the plate body and a second partial surface (F12, F22, F32) extending at an angle, particularly an angle of 90°, to the first partial surface.

15 Claims, 3 Drawing Sheets

(56) References Cited

U.S. PATENT DOCUMENTS

| | | | |
|---|---|---|---|
| 6,190,277 B1 * | 2/2001 | Blase | F16G 13/16 |
| | | | 474/218 |
| 2003/0136456 A1 | 7/2003 | Blase | |
| 2015/0128556 A1 * | 5/2015 | Hermey | F16G 13/16 |
| | | | 59/78.1 |
| 2017/0108082 A1 * | 4/2017 | Barten | F16G 13/16 |
| 2017/0292588 A1 * | 10/2017 | Hermey | H02G 11/006 |

FOREIGN PATENT DOCUMENTS

| | | |
|---|---|---|
| DE | 20002820 | 6/2000 |
| DE | 102008060466 | 6/2010 |
| DE | 102011082243 | 3/2013 |
| EP | 0415029 | 3/1991 |
| WO | 9504231 | 2/1995 |

OTHER PUBLICATIONS

International Search Report from corresponding PCT Appln. No. PCT/EP2020/051520, dated Jul. 8, 2020.
Office Action from related Singaporean Appln. No. 11202108117T, dated Mar. 29, 2023.
Office Action from related Indian Appln. No. 202137034130, dated Mar. 3, 2023. English translation attached.

* cited by examiner

OPERATIONALLY STABLE SIDE PLATE FOR AN ENERGY CHAIN

The invention relates generally to a side plate for an energy guide chain. Energy guide chains are used for the dynamic and protected guidance of flexible lines, such as hoses, cables or the like, between two connection points which are mobile relative to one another. Energy guide chains are produced from chain links, each of which typically comprises two opposing side plates which are permanently or detachably connected to each other via a crosspiece or two opposing crosspieces. The plate body of generic side plates has two overlap regions, each of which is for swivelable or articulated connection to a corresponding overlap region of an adjoining plate, and a central region therebetween.

Energy guide chains with side plates which have a one-piece, flat plate body of plastics material have proved effective. Side plates of plastics material enable, inter alia, a significant reduction in weight in comparison with sheet metal plates.

Two types of plastics material side plates are frequently used: complementary inner and outer plates which are connected to each other alternately in the longitudinal direction to form a string of plates, as for example described in WO 95/04231 A1, or alternatively side plates which are offset in plan view, as for example described in DE 3 531 066 C2 or U.S. Pat. No. 4,813,224 A. Both types of plate can in each case be produced inexpensively by injection molding.

With both types, the side plates in each case have a number of cross-sectional transitions in the overlap region and/or central region, in each case between two subregions of outer surfaces since, as a result of their function, they are or extend at an angle, in particular perpendicularly, to one another.

It is common practice to produce certain of these cross-sectional transitions in rounded form, in particular to avoid sharp-edged transitions or to soften edges. Transitions are, for example, rounded from the large side surfaces to the narrow sides in order to avoid interfering edges, or the free front ends of the swivel pins are rounded to facilitate assembly. Cross-sectional transitions are typically rounded as a radius transition with a small radius in the form of a quarter-circle arc, which is applied symmetrically to the subsurfaces.

Irrespective of their design, side plates are exposed to very high forces during operation of the energy guide chain, in particular in the case of long guide lengths or travel paths and/or high speeds. Such forces arise, inter alia, not only from the transmission of tensile force required for movement but also, for example, at the limit stops for limiting swivel angles, for instance in self-supporting applications (with a self-supporting upper run at a distance above a lower run) or in the deflection arc between chain runs. Due to the back and forth movement of the moved run, the stresses or loads to which the side plates are exposed are fundamentally dynamic and are often repetitive, usually cyclically, at a high rate. In such cases, there is an elevated risk of fatigue damage due to load cycling.

In practice, fatigue weak points are usually eliminated by durable design with a suitably increased wall or material thickness in the critical region of the side plates. However, this leads to higher material costs and a higher intrinsic weight of the energy chain. This approach is not ideal because the forces to be transmitted during operation also increase with weight.

Although hitherto seldom used for this purpose, the above-stated radius transitions or also for example rounded connected line segments as cross-sectional transitions may theoretically bring about a certain reduction in stress peaks or notch stresses in the plate body in a load-bearing region and so reduce the risk of fatigue damage.

Long-term tests in the applicant's test laboratory have revealed that side plates can also fail at conventional rounded cross-sectional transitions, presumably due to residual notch effect or material stresses, after an elevated limiting number of load cycles. This also occurs at loads well below the static strength or load capacity and sometimes before other sharp-edged transitions in the force flow fail. Conventional circular radius transitions therefore do not appear to be ideal.

A first object of the present invention is therefore that of further developing generic plastics material side plates for energy guide chains without overdimensioning or the need for a more robust design through additional material in such a way that they nevertheless have elevated operational endurance (fatigue strength). The possibility should additionally be opened up for further weight savings by reducing wall thicknesses or the mass of plastics material in the side plate.

According to the invention, at at least one region which is intended to serve for load bearing and has been identified as critical, a specifically shaped cross-sectional transition is provided for this purpose with a first and a second subsurface of the plate body, whether at the overlap regions, at the central region, or at the transition between overlap region and central region. It is proposed for this purpose that this selected cross-sectional transition be defined by an enveloping transition curve having a specific course, wherein the cross-sectional area of the cross-sectional transition decreases continuously, in particular falls monotonically (as defined by the corresponding curve function), along the transition curve from the starting point to the endpoint. The course according to the invention of the transition curve is set such that, for a selected starting point of the transition curve in or on the first subsurface which is located at a distance A from the notional intersection curve of the first subsurface with the second subsurface, the curve endpoint is located in or on the second subsurface at a predetermined, greater distance Z from this intersection curve, namely a distance Z with $1.7 \cdot A \leq Z \leq 4.0 \cdot A$, in particular with $2.3 \cdot A \leq Z \leq 3.4 \cdot A$.

In a nutshell, the transition in the cross-section is thus shaped in accordance with a monotonically falling curve which, according to the invention, is selected or constructed such that its endpoint distance Z from the intersection curve of the two adjoining surfaces is distinctly greater than its corresponding starting point distance A, namely in particular in the range $1.7 \leq Z/A \leq 4.0$.

Such a cross-sectional transition is distinctly more favorable with regard to fatigue damage, in particular force flow-related local stress concentrations or stress peaks, than conventionally applied quarter-circle rounding radii. The cross-sectional transition can be scaled to any desired installation spaces or constraints. For planar surfaces, the intersection curve, from which the distance of the start and endpoint is considered, corresponds to an intersection line. For other pairs of surfaces, for example with a cylindrical swivel pin surface or a transition surface curved in the plane of the plate, the intersection curve is, in contrast, not a straight line. The envelope transition curve is preferably at least in places or predominantly constant along the cross-sectional transition, i.e. is an envelope or envelope curve to the outer surface of the cross-sectional transition.

It is particularly favorable for the transition curve to correspond to a smooth or stepless and strictly monotonically falling curve as defined mathematically or by a functional analysis. The radius of curvature may at least in places be constant along the curve. A curve which is of constant curvature in places or in its entirety with a starting point distance A and endpoint distance Z in the ratio range $1.7 \leq Z/A \leq 4.0$ may also be used.

According to an independent aspect, irrespective of the distance ratio Z/A, the invention also relates to a cross-sectional transition defined by a transition curve which is smoothly (steplessly) and strictly monotonically falling and is distinguished by particular characteristics of its curve tangent or curve slope (or first derivative or differential quotient) which is of relevance to force flow along its course. According to the invention, a transition curve is selected, the curve tangent of which at the starting point (viewed extremally) intersects the first surface at an angle of approx. 45°±10°, in particular ±5°, and the curve tangent of which rotates progressively or monotonically along the course of the curve in a direction parallel to the second surface and at the endpoint is preferably virtually (±10°, preferably ±5°) or technically parallel to the second surface.

The transition curve may comprise a plurality of continuously merging, for example straight, portions which are constructed for example in accordance with a method suitable for relieving notch stresses.

The proposed transition contour distinctly reduces the risk of incipient cracking under dynamic loading at cross-sectional transitions according to the invention. As is known from metal materials science, such incipient cracking may also occur in comparatively more flexible polymeric plastics under load cycling and grow to the point of residual fracture. Accordingly, the use of cross-sectional transitions shaped according to the invention enables the production of a side plate designed for operational endurance without additional use of materials. In particular, in comparison with existing designs of side plates, it is also possible to achieve material savings by avoiding or deliberately eliminating unnecessary overdimensioning.

In particular in the case of side plates intended to overlap on just one side, such as complementary inner plates and outer plates or alternatively offset plates, experience has shown that critical areas are located where forces flow from a region area extending primarily in the main plane of the plate into a region extending predominantly perpendicularly thereto. The transition curve is therefore preferably placed with its starting point on or in a first subsurface perpendicular to the main plane of the side plate and correspondingly the endpoint in a second subsurface parallel to the main plane of the plate body. The invention may in principle be used for any side plate transitions which are critical with regard to fatigue damage due to load cycling. Investigations have, however, revealed two particularly susceptible locations with which appreciable material savings can be achieved.

A first critical location with regard to fatigue failure is at the transition between the overlap region and the typically thicker central region, i.e. in a preferred embodiment the first subsurface with the starting point is located at the central region and the second subsurface with the endpoint at an overlap region. The cross-sectional transition may thus in particular be provided at the transition between a smaller wall thickness of this overlap region and a greater wall thickness of the central region. Accordingly, a corresponding matching contour can be provided at the front end of the side plates in order to ensure the necessary movement clearance.

The side plate transmits elevated forces, namely alternating tensile and thrust forces, in particular in the case of long chains and in the first third of the energy guide chain at the moving end. As a result of abrupt changes in wall thickness and/or lateral offset of the overlap regions, both transitions to the central region are here exposed to pronounced loads.

A second critical location with regard to fatigue failure is in the stop pockets or stop recesses, which form counter stops for corresponding stop projections of the immediately adjoining or overlapping plate. A stop projection engages in the stop recess to limit the swivel angle, typically in both swivel directions. As investigations have shown, the bottom transition in stop recesses is at elevated risk of breakage, in particular in long self-supporting energy guide chains. It is accordingly furthermore particularly advantageous for the first subsurface with the starting point to constitute a stop surface with a limit stop effect of a stop recess in an overlap region, wherein the second subsurface with the endpoint constitutes a bottom wall which closes the stop recess on one side. The interaction with a corresponding transition curve on the associated stop projection is advantageous, such that stress concentrations or stress peaks on the stop projection are also reduced or material savings are enabled.

The proposed contour of the cross-sectional transition may also be used at other force-transmitting regions of the side plate, for example at the articulated joint of the side plates. A further embodiment accordingly provides that the first subsurface with the starting point is located on a swivel pin in the overlap region and the second subsurface with the endpoint is located on a sidewall region from which the swivel pin protrudes, wherein the swivel pin serves as the articulated joint and is exposed during operation to elevated forces perpendicular to the swivel axis. A correspondingly conjugated contour may also be provided at the corresponding pin receptacle but, depending on the design of the side plate, transverse forces do not necessarily arise here.

It is furthermore within the scope of the invention to provide the proposed transition curve on material recesses which serve, for example, to reduce weight and/or, similarly to a relief notch, to reduce stress concentrations or peaks in the plate body. The first subsurface with the starting point may here be located on an outer surface of the plate body and the second subsurface with the endpoint may be located in the material recess. The combination of the cross-sectional transition for minimizing stress concentrations with such a material recess allows weight reductions without critical losses in stability and/or optimization of force flow in the side plate, in particular a reduction of notch stresses if the material recess acts in the manner of a relief notch.

It is, of course, possible to apply the cross-sectional transition according to the invention to just one of the above-stated surface transitions or cumulatively to a plurality thereof. It is also within the scope of the invention to apply the cross-sectional transition advantageously to other regions of the plate body.

A transition curve which is particularly easy but favorable to implement in computer-aided product development corresponds to a circle segment, in particular a 45° circle segment, i.e. an "eighth circle". The transition curve with a suitable constant radius is here preferably applied such that the endpoint is located at a distance Z from the intersection curve with $2.2 \cdot A \leq Z \leq 2.6 \cdot A$ and the construction circle for the circle segment, such as an osculating circle or circle of curvature, is applied tangentially to the second surface. The construction circle of the transition curve, which is tangential to the second surface, can be applied tangentially to the second surface, in particular with a radius suitable for a ratio Z/A=2.5. The desired ratio Z/A determines the required radius of the circle segment. It is likewise possible to use other suitable curve shapes which, for example in relation to the protrudingly constructed 45° circle segment, extend between two equidistant or parallel curves on both sides at a distance of d=0.1·A from the 45° circle segment with Z/A=approx. 2.5.

A preferred transition curve is one which corresponds to a function which, at least between the starting point and endpoint of the curve, falls smoothly and strictly monotonically, since it is consequently possible to avoid any jumps or residual edges between the starting point and endpoint. Trigonometric functions for example, in particular the tangent function, are suitable for this purpose.

The angle between the first external subsurface and the second outer subsurface of the plate body may be a constant 90° along the cross-sectional transition, but the cross-sectional transition may also be applied to surfaces with a different angle to one another, wherein advantageous effects are achieved above all at angles α close to 90° and optionally also in the range 45°≤α≤135°.

The problem of stress concentrations is pronounced in surfaces which are substantially perpendicular to one another in force-transmitting areas. In the case of such surfaces, it may be provided that the course of the transition curve in the initial portion at the starting point has a tangent (determined by derivation or differential quotient or as a curve slope) which intersects the first subsurface at an angle of approx. 45°±5°. A slight edge may optionally remain or also be avoided by rounding at this intersection curve with the cross-sectional transition. Furthermore, it is in principle advantageous to select the course of the transition curve such that, in the end section at the end point, viewed in relation to the curve tangent thereof, said curve is located substantially parallel, optionally ±5°, to the second subsurface and ideally is located exactly in the latter, which can be simply achieved in design terms for example with the protruding 45° circular segment arc with Z/A=2.5.

In principle, the at least one cross-sectional transition is located asymmetrically to the bisector of the first and second surfaces because relevant loads are primarily or predominantly uniaxial.

The cross-sectional transition is therefore particularly advantageous if or where the second subsurface with the endpoint of the transition curve is subjected to tensile loading at an intended region in at least one of the two alternating load cases, i.e. is provided in a tensile force-transmitting region of the plate body.

The cross-sectional transition can be produced straightforwardly and without any particular effort even in very large quantities by suitable design of molding tools if said transition is produced in one piece with the plate body from a thermoplastic, in particular by the injection molding method. It may accordingly be produced without any post-processing, for example by machining.

The invention relates to inner plates, outer plates or offset plates, in particular one-piece plastics plates which have at least one proposed cross-sectional transition. The invention accordingly also relates to a chain link of an energy guide chain with two such side plates and to an energy guide chain constructed therefrom in its entirety.

Further features and advantages of the invention may be inferred without limitation of the scope of protection from the following, more detailed description of preferred exemplary embodiments made on the basis of the appended figures, in which, purely by way of example:

FIGS. 1A-1E show an offset side plate 10 which is produced as a one-piece plate body of plastics material by the injection molding method. The side plate 10 has two flat, laterally staggered overlap regions 11A, 11B and a central region 12 over half a chain pitch length. The central region 12 has a greater wall thickness in comparison with the overlap regions 11A, 11B. The first overlap region 11A has a joint receptacle 13 for swivelable engagement with a matching joint pin 14 of an identically constructed side plate 10 which is to be connected. The joint pin 14 protrudes on the outside from the opposing second overlap region 11B. Identically dimensioned stop pockets 15A, 15B are in each case provided on circular arc-shaped end regions of the overlap regions 11A, 11B as cutouts in the plate body. A matching stop projection 16A, 16B of the respective adjoining side plate 10 engages in each stop pocket 15A, 15B, in order to limit the relative swivel angle about the swivel axis of the cylindrical joint pin 14 to the desired width. This proceeds by the stop projection 16A, 16B coming to a stop in the complementary stop pocket 15A, 15B. Fastening projections of the side plate 10 for crosspieces are, for example, not shown. The side plate 10 may moreover also be a component of a chain link produced in one piece with an opposing side plate which is mirror-reflected to the side plate 10 and is otherwise identically constructed.

Figure 1A:
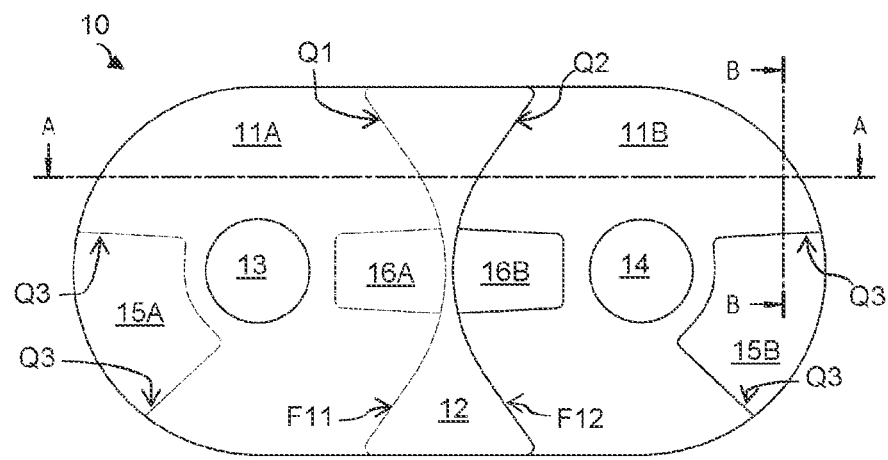
FIGS. 1A-1E show views of an offset side plate according to a first embodiment in side view from the outer side facing away from the chain interior (FIG. 1A), in longitudinal section according to section line A-A (FIG. 1B), in an enlarged partial cross-section D (FIG. 1D), in perspective (FIG. 1C) and in an enlarged partial cross-section (FIG. 1E) according to section line B-B from FIG. 1A.
Figure 1B:
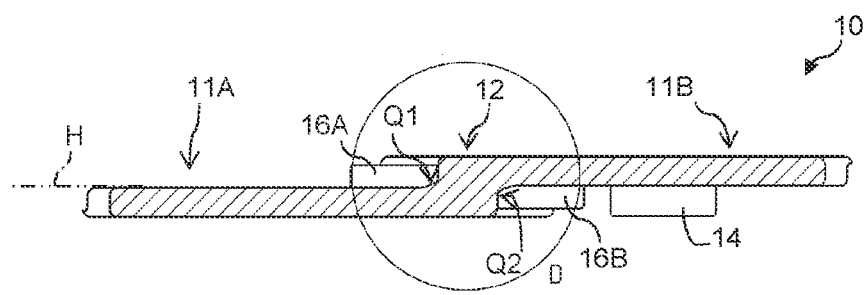
Figure 1C:
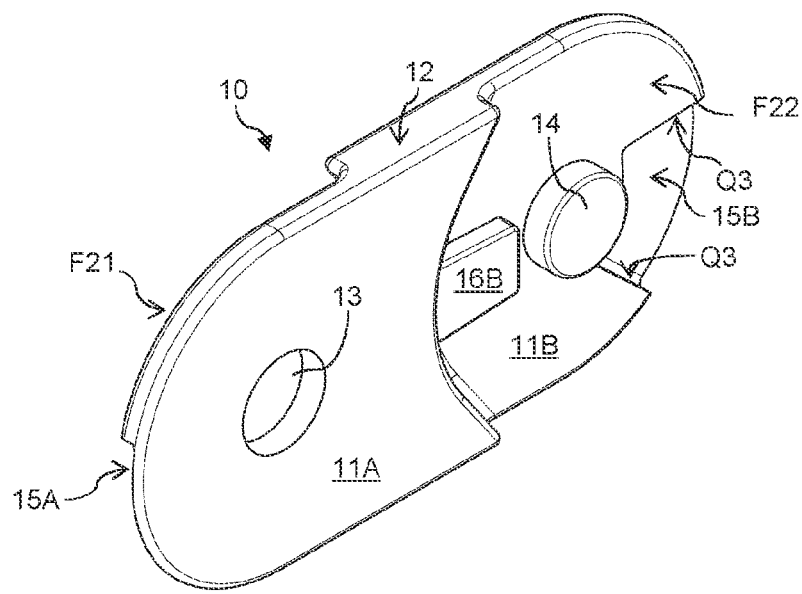
Figure 1D:
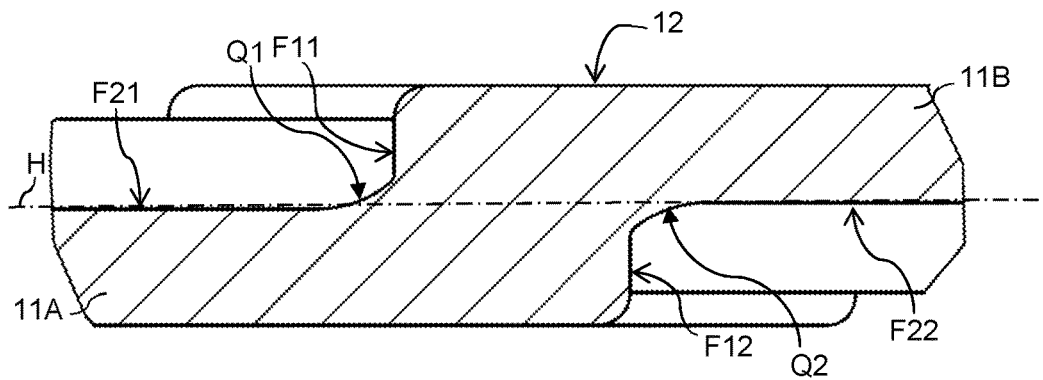

In the longitudinal direction of the side plate 10, the central region 12 is delimited on both sides by a front-end surface F11, F12 which extends in an approximately circular arc shape around the respective swivel axis and is located perpendicular to the main plane H of the plate (FIG. 1D). The inside of the outwardly offset overlap region 11A forms a planar surface F21 and the outside of the inwardly offset overlap region 11B forms a further flat surface F21. The surfaces F21, F22 are located parallel to and slightly laterally staggered with movement clearance to the main plane H of the plate, i.e. the surfaces F21, F22 are perpendicular to the front-end surface F11, F12. The surface F21 of the first overlap region 11A and the one front-end surface F11 of the central region 12 are connected by a cross-sectional transition Q1. The surface F22 of the second overlap region 11B and the other front-end surface F12 of the central region 12 are connected by a cross-sectional transition Q2. The cross-sectional profile of the cross-sectional transitions Q1, Q2 is identically shaped corresponding to a transition curve C, which is shown in greater detail for example in FIG. 2, with a shorter leg toward the front-end surface F11, F12 and a longer leg toward the lateral surfaces F21, F22.

Figures 1E, 2:
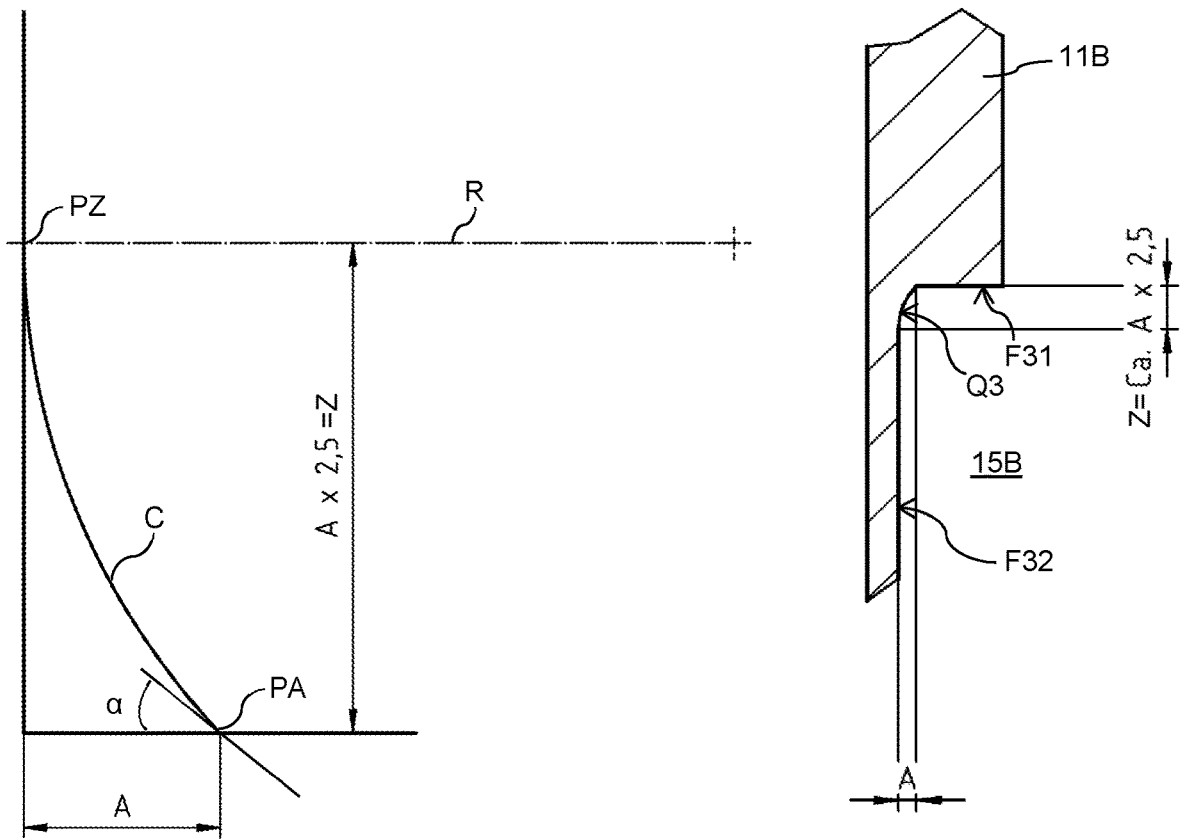
FIG. 2 shows a greatly enlarged curve representation of the transition curve of the cross-sectional transition which is shown for example in FIG. 1D and FIG. 1E.

FIG. 1E shows a further cross-sectional transition Q3, the profile of which is defined by the transition curve C from FIG. 2. The cross-sectional transition Q3 bridges a stop surface F31 with a limit stop effect as the edge of the stop pocket 15B in the overlap region 11B and the outer surface F32 of a bottom wall which closes the stop pocket 15B on one side, in FIG. 1E toward the chain interior, with a relatively small (wall) thickness in comparison with the remainder of the overlap region 11B. Identically shaped cross-sectional transitions Q3 are provided on both sides in both stop pockets 15A, 15B, in each case on the stop surface serving as a mating stop for the stop projection 16A, 16B. Instead of rounded edges (not shown), cross-sectional transitions complementary to the cross-sectional transitions Q3 may optionally be provided on each stop projection 16A, 16B.

The cross-sectional transitions Q1, Q2, Q3 according to the transition curve C are optimized with regard to fatigue damage, in particular force flow-related local stress concentrations or stress peaks in the respective region of the plate body of the side plate 10 since these regions have to withstand constant load cycling and/or elevated forces. The cross-sectional transitions Q1, Q2 or Q3 permit a reduction in material thickness of the plate body or further reduction of the bottom wall of the stop pockets 15A, 15B or, at constant material thickness, bring about increased operational endurance (resistance to repeated load cycling) of the adjoining regions of the side plate 10.

In further regions which are not critical with respect to stress peaks, the overlap regions 11A, 11B and the central region 12 moreover have cross-sectional transitions which are rounded as chamfers or conventionally with a radius corresponding to a quarter circle. Conventional radius curvatures are here shown by way of example for the transitions of the lateral surfaces F21, F22 of the overlap regions 11A, 11B to the upper and lower narrow sides of the side plate 10 (FIG. 1C) or for the front-end surface F11, F12 to the outer side surfaces of the side plate (FIG. 1D).

FIG. 2 shows a preferred transition curve C for constructing the cross-sectional transitions Q1, Q2 or Q3, wherein the transition curve C should be scaled to the respective size ratios. As is apparent from FIG. 2, the starting point PA of the transition curve C on the one subsurface F11, F21, F31 is in each case at a distance A from the intersection curve of the first subsurface with the second subsurface F12, F22, F32, in this case perpendicular due to perpendicular subsurfaces, and the endpoint PZ of the transition curve C on the second subsurface F12, F22, F32 is at a distance Z from the intersection curve of the two subsurfaces, in this case perpendicular to the subsurface F11, F21, F31. In FIG. 2 the distance Z of the end point PZ amounts to approx. Z=2.5·A and the transition curve C is a 45° circular arc segment, the radius R of which is selected for a desired distance A such that the circle forming the circular arc segment tangentially meets the second subsurface F12, F22, F32 at exactly Z=2.5·A or touches the latter only at the point PZ. It is accordingly simultaneously ensured that the cross-sectional area of the cross-sectional transition Q1, Q2 or Q3 decreases continuously along the transition curve C from the starting point PA to the endpoint PZ, in this case according to a strictly monotonically falling curve. The transition curve C is preferably selected such that 2.3·A≤Z≤3.4·A is observed, particularly preferably 2.2·A≤Z≤2.6. Other functions, in particular without a constant radius of curvature, may also be considered, for example a tangent curve (not shown), for instance tangent (x) with x=0 to x(PZ) and 1.25≤x(PZ)≤1.4 or applied such that Z/A≈3.4 and the curve intersects the first subsurface F11, F21, F31 at PA at approximately 45°. The latter may in particular be considered for transitions of perpendicular surfaces (as in FIGS. 1A-1E). Other trigonometric functions may also be considered or for example an elliptical segment, provided the curve tangent rotates continuously, preferably strictly monotonically, along the course of the curve in the direction of parallelism with the second subsurface F12, F22, F32.

Transition curves favorable for optimizing force flow extend between two equidistant or parallel curves on both sides at a distance d=0.1·A from the 45° circle segment with Z/A=approx. 2.5. On the basis of a limit value consideration, the transition curve C has a tangent at the starting point PA which intersects the first subsurface F11, F21, F31 for instance at an angle of approx. 45°±5°, wherein a residual edge can be left as non-critical at this point to simplify design.

Figure 3A:
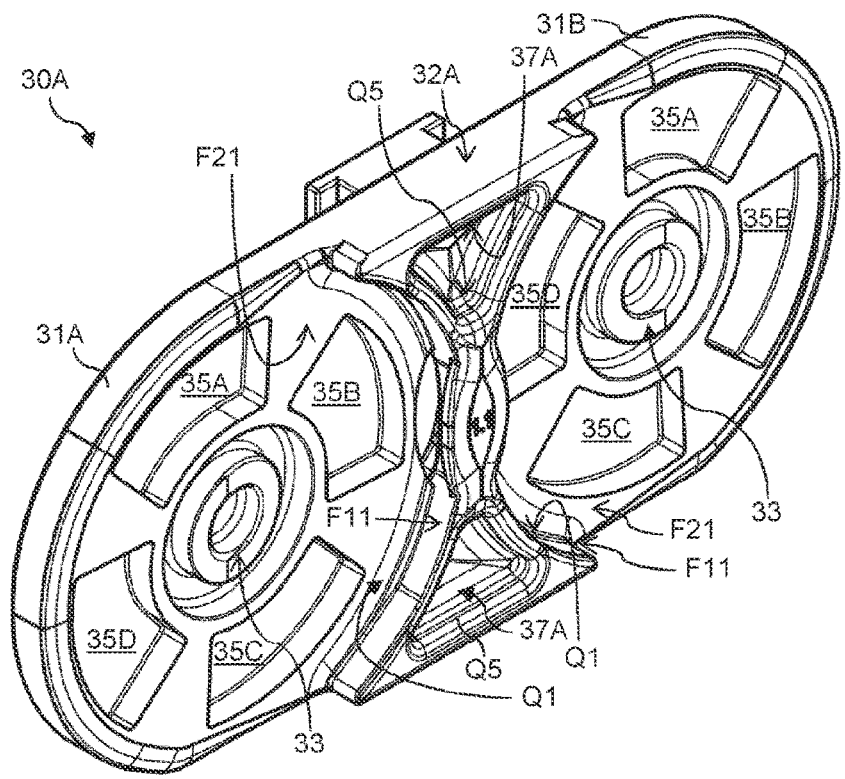
FIG. 3 shows perspective views of an inner plate from the outside (FIG. 3A) and an outer plate from the inside (FIG. 3B).
Figure 3B:
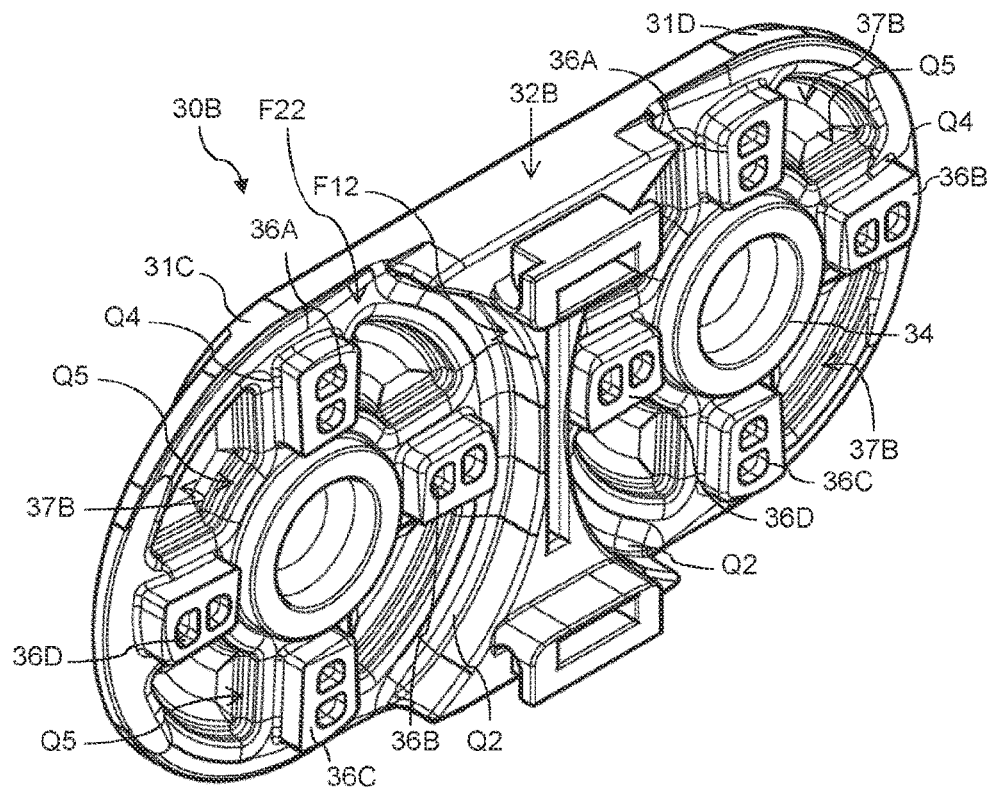

FIGS. 3A-3B show a second exemplary embodiment with an inner plate 30A and an outer plate 30B. The inner plate 30A, with two overlap regions 31A, 31B and a central region 32A, is produced in one piece of plastics material. The outer plate 30B, with two overlap regions 31C, 31D and a central region 32B, is likewise produced in one piece in an injection molding step. The inner plate 30A and the outer plate 30B are in each case symmetrical with respect to their vertical central plane and are swivelably connected together in an alternating sequence to form a string with the assistance of the joint receptacles 33, in this case on the inner plate 30A, and the joint pins 34, in this case on the outer plate 30B. The inner plate 30A has on the outside four identically shaped stop pockets 35A, 35B, 35C, 35D distributed rotationally symmetrically about the swivel axis. The outer plate 30B has on the inside four protruding stop projections 36A, 36B, 36C, 36D to engage matchingly in said pockets for the purpose of limiting the swivel angle.

Similarly to the principle from FIG. 1D, according to FIG. 3A front-end surfaces F11 of the central region 32A of the inner plate 30A merge with cross-sectional transitions Q1 into lateral surfaces F21 perpendicular to the front-end surfaces F11 of the overlap regions 31A, 31B. The cross-sectional transitions Q1 are correspondingly scaled according to the transition curve C from FIG. 2. In correspondingly similar manner, front-end surfaces F12 merge from the central region 32B of the outer plate 30B (FIG. 3B) with cross-sectional transitions Q1 into lateral surfaces F21 of the overlap regions 31C, 31D in order to reduce the risk of fatigue fracture in these critical regions.

In contrast with FIGS. 1A-1E, in order to reduce notch stresses, the outer plate 30B here has further cross-sectional transitions Q4 according to the invention at the stop projections 36A, 36B, 36C, 36D. The cross-sectional transitions Q4 are in each case located circumferentially at the base of the stop projections 36A, 36B, 36C, 36D and correspond to a scaled transition curve C from FIG. 2. Cross-sectional transitions corresponding to FIG. 1E may optionally also be used in the stop pockets 35A, 35B, 35C, 35D.

FIGS. 3A-3B furthermore show two material recesses 37A on the outside of the central region 32A of the inner plate 30A and in each case four further rotationally symmetrically arranged and identically shaped material recesses 37B in the outer plate 30B. Using cross-sectional transitions Q5 according to the invention according to a transition curve C as shown in FIG. 2 for the inward transition into these material recesses 37A, 37B enables better material utilization in the plate body of the inner plate 30A and the outer plate 30B and thus simultaneously a perceptible reduction in component mass or the quantity of plastics material required per plate, so lowering material costs and possibly reducing injection molding machine cycle times.

With regard to other per se known features of an energy guide chain, some of which are not shown here, reference is finally made for brevity's sake, to DE 3 531 066 C2 (with offset plates) or to WO 95/04231 A1 (with inner/outer plates). The terms inner and outer should be understood below in relation to the receiving space for lines in the chain link of the energy guide chain (not shown).

LIST OF REFERENCE SIGNS

FIGS. 1A-1E
10 Side plate (offset)
11A, 11B Overlap regions
12 Central region
13 Joint receptacle
14 Joint pin
15A, 15B Stop pocket
16A, 16B Stop projection
F11, F21, F31 First subsurface
F12, F22, F32 Second subsurface
H Main plane of the plate
Q1, Q2, Q3 Cross-sectional transition
FIG. 2
C Transition curve
PA Starting point (transition curve)
PZ Endpoint (transition curve)
R Radius (45° circle segment)
FIGS. 3A-3B
30A Inner plate
30B Outer plate
31A, 31B Overlap regions (inner plate)
31C, 31D Overlap regions (outer plate)
32A, 32B Central region
33 Joint receptacle
34 Joint pin
35A, 35B, 35C, 35D Stop pocket
36A, 36B, 36C, 36D Stop projection
37A, 37B Material recess
F11, F21 First subsurface
F12, F22 Second subsurface
Q1, Q2, Q4, Q5 Cross-sectional transition

The invention claimed is:

1. A side plate for an energy guide chain, the side plate comprising:
a one-piece plate body of plastics material with two overlap regions, each overlap region of the two overlap regions for swivelable connection to a corresponding overlap region of an adjoining plate,
a central region between the overlap regions, and
wherein the overlap regions and the central region have a plurality of cross-sectional transitions, wherein each cross-sectional transition of the plurality of cross-sectional transitions is between two outer subsurfaces,
at least one cross-sectional transition of the plurality of cross-sectional transitions, between a first subsurface of the plate body and a second subsurface of the plate body extending at an angle 90° to the first subsurface, is rounded or chamfered,
wherein the at least one cross-sectional transition is delimited by an envelope transition curve with a course such that, for a starting point of the transition curve at the first subsurface, which is located at a distance A from an intersection curve of the first subsurface with the second subsurface, an endpoint of the transition curve at the second subsurface is located at a distance Z from the intersection curve with $1.7\,A \le Z \le 4.0\,A$, and such that a cross-sectional area of the cross-sectional transition decreases continuously along the transition curve from the starting point to the endpoint.

2. The side plate according to claim 1, wherein the transition curve corresponds to a smooth or stepless, and strictly monotonically falling curve.

3. The side plate according to claim 2, wherein the course of the transition curve is selected such that the endpoint is located at the distance Z from the intersection curve with $2.2\,A \le Z \le 2.6\,A$, and the course corresponds to a 45° circle segment of a circle which tangentially touches the second subsurface in the endpoint.

4. The side plate according to claim 1, wherein the first subsurface is located perpendicular to a main plane of the side plate and the second subsurface is located parallel to the main plane of the plate body.

5. The side plate according to claim 4, wherein the first subsurface with the starting point is located on the central region, and the second subsurface with the endpoint is located on an overlap region of the overlap regions.

6. The side plate according to claim 4, wherein the first subsurface with the starting point corresponds to a stop surface with a limit stop effect of a stop recess in an overlap region of the overlap regions, and the second subsurface with the endpoint corresponds to a bottom wall which closes the stop recess on one side.

7. The side plate according to claim 4, wherein the first subsurface with the starting point is located on a swivel pin in an overlap region of the overlap regions, and the second subsurface with the endpoint is located on a sidewall region from which the swivel pin protrudes.

8. The side plate according to claim 1, wherein the transition curve defines the cross-sectional transition from an outer surface of the plate body into a material recess.

9. The side plate according to claim 1, wherein the angle between the first subsurface and the second subsurface amounts to a constant 90° along the cross-sectional transition,
wherein the course of the transition curve in an initial portion at the starting point has a tangent which forms an angle of approx. 45°±5° with the first subsurface, and/or
wherein the course of the transition curve in an end portion at the endpoint has a tangent which is substantially parallel to the second subsurface or continuously merges into the second subsurface.

10. The side plate according to claim 1, wherein the at least one cross-sectional transition is asymmetric to a bisector of the first and second subsurfaces and/or is produced in one piece with the plate body from a thermoplastic.

11. The side plate according to claim 10, wherein the thermoplastic is injection molded.

12. The side plate according to claim 1, wherein the second subsurface with the endpoint of the transition curve is provided at a region of the plate body which is to transmit at least tensile force.

13. The side plate according to claim 1, wherein the side plate takes a form of an inner plate, an outer plate or an offset plate.

14. A chain link comprising the side plate according to claim 1.

15. The side plate according to claim 1, wherein $2.3\,A \le Z \le 3.4\,A$.

* * * * *